J. McNISH.

Churn.

No. 20,025.

Patented April 20, 1858.

UNITED STATES PATENT OFFICE.

JAMES MACNISH, OF BERLIN, WISCONSIN.

CHURN.

Specification forming part of Letters Patent No. 20,025, dated April 20, 1858; Reissued November 30, 1858, No. 630.

*To all whom it may concern:*

Be it known that I, JAMES MACNISH, of Berlin, in the county of Marquette and State of Wisconsin, have invented a new and useful Improvement in Churns; and I do hereby declare that the following is a full, clear, and exact description of the same, reference being had to the accompanying drawings, forming a part of this specification, in which—

Figure 1:
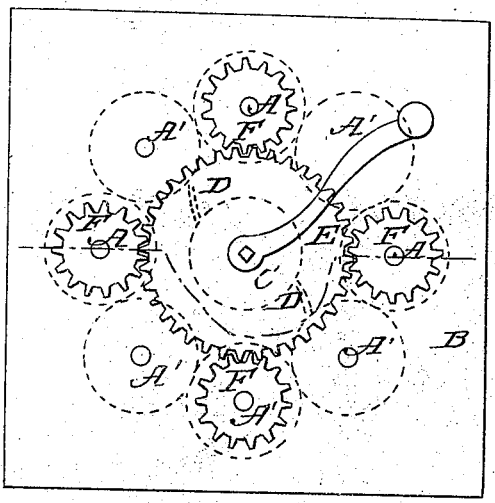
Figure 2:
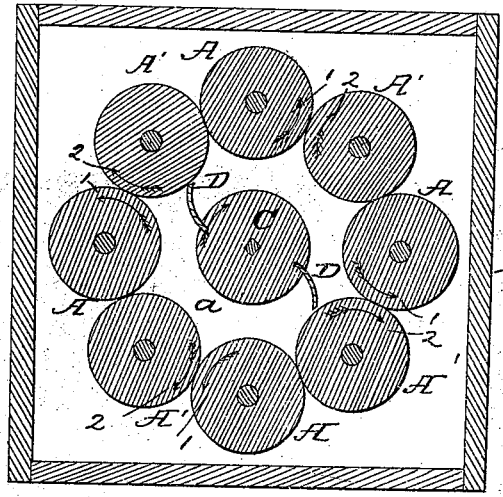
Figure 3:
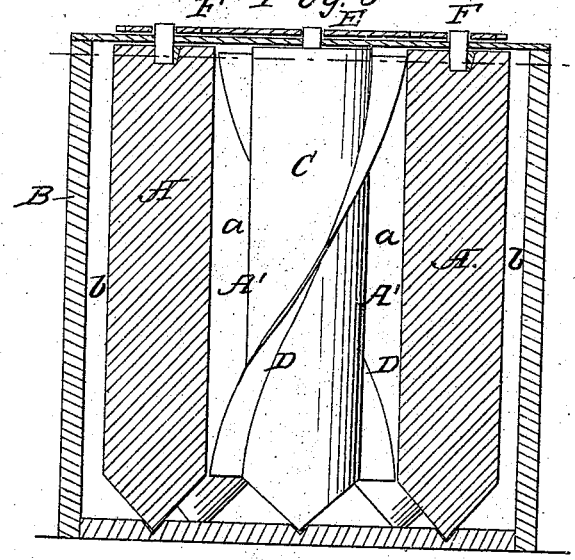
Figure 4:
Figure 5:
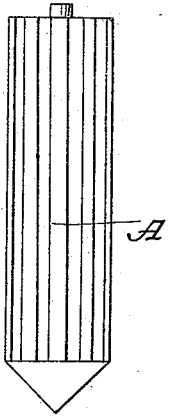

Figure 1, is a plan of a churn constructed with my improvements. Fig. 2, is a horizontal section of the same. Fig. 3, is a vertical transverse section of the same in the line $x$, $x$, of Fig. 1. Figs. 4 and 5, show different styles of expressing rollers which I propose to employ.

Similar letters of reference in each of the several figures indicate corresponding parts.

The nature of my invention consists in the combination of a central spiral flanched or winged agitating shaft, with a series of encircling expressing rollers, a portion of which have a direct motion in one direction while the others have an indirect motion in an opposite direction. With this arrangement or combination, the two actions essential to the production of butter from milk or cream are secured, to wit; a thorough lifting, beating, or breaking action, and a close friction or expressing action, as will be hereinafter specified.

To enable others skilled in the art to make and use my invention, I will proceed to describe its construction and operation.

A, A′, represent a circle of rollers of which the lower portions are cone shaped, the points of the cones revolving in suitable orifices made in the bottom of the churn box B, at such distances from each other in the path of a circle as to admit of the periphery of the rollers touching at every point from the inverted base of the cone to the top of the rollers.

C, is the central agitating shaft or roller provided with two or more semi-spiral flanches or wings D, D. A large spur wheel E is fitted fast to the upper end of the roller C, and small pinion wheels F, F, F, F, to the upper ends of the expressing or friction rollers A, A, A, A. The large spur wheel and the pinions gear together as illustrated in Fig. 1, and it will be perceived by reference to Fig. 1, that by applying power to the central shaft and revolving it, a direct motion will only be communicated to every alternate roller A, and that the rollers A, when set in motion in the direction indicated by the arrows 1 communicate, by friction, motion in an opposing direction to the rollers A′, as indicated by the arrows 2.

By turning the central roller C, rapidly, the cream is dashed by the action of the flanches against the inside of the encircling rollers A, A′, which are at the same time set in motion in the direction indicated by the arrows, thus pressing the milk or cream between them as it passes from the inside space $a$, within the circle of rollers A, A, into the space $b$, outside of the same.

The effect of the semi-spiral formation of the flanches is raising the milk or cream to the upper central portion of the churn and creating a partial vacuum in the lower central portion. This vacuum is immediately filled by cream rushing in from space $b$, between the cone shaped points of the rollers, its passage back being aided by the motion of the rollers in the direction of the arrow 2. By this arrangement every portion of the milk or cream is repeatedly subjected to the friction of the rollers in the circle until all the globules which contain the butter are burst. The rollers as shown in Fig. 2, are smooth on the surface and this form is best adapted to the churning of milk. For thin cream, the corrugated roller (see Fig. 4) is best, and for thick cream the fluted roller (see Fig. 5).

It will be perceived that when this machine is set in motion, three separate and distinct results are accomplished, 1st, the cream is raised from the bottom of the central space $a$. 2nd, it is dashed against the inside of the encircling rollers. 3rd, it is subjected to close friction in its passage through between the rollers and thus all the conditions necessary to produce good butter in the shortest possible time are fulfilled.

The rollers are all secured to the iron frame at the top and have no fastening below, all that is necessary when the churning is completed is to lift off the top frame which necessarily takes out the rollers and removes every impediment to gathering the butter.

What I claim as my invention and desire to secure by Letters Patent, is—

5  The combination of a central spiral flanched or winged agitating shaft C, with a series of encircling expressing rollers A, a portion of which have a direct motion in one direction while the others have an indirect motion in an opposite direction.

JAMES MACNISH.

Witnesses:
 G. YORKE AT LEE,
 B. W. FENWICK.

[FIRST PRINTED 1912.]